United States Patent [19]

Karnopp et al.

[11] Patent Number: 4,852,699
[45] Date of Patent: Aug. 1, 1989

[54] DISK BRAKE ASSEMBLY

[75] Inventors: Dean C. Karnopp; Yoshiyuki Yasui, both of Davis, Calif.

[73] Assignee: Aisin Seiki Kabushiki Kaisha, Japan

[21] Appl. No.: 32,255

[22] Filed: Mar. 31, 1987

[51] Int. Cl.⁴ .................... F16D 55/224; F16D 65/21; F16D 63/00
[52] U.S. Cl. .................... 188/72.2; 188/72.6; 188/162; 188/220.1
[58] Field of Search .............. 188/72.1, 72.2, 72.6, 188/73.41, 220.1, 162, 72.9

[56] References Cited

U.S. PATENT DOCUMENTS

| | | | |
|---|---|---|---|
| 343,680 | 6/1886 | Tribe | 188/72.6 |
| 3,207,267 | 9/1965 | Beuchle et al. | 188/72.9 X |
| 3,315,769 | 4/1967 | Francois | 188/72.2 |
| 3,390,744 | 7/1968 | Fawick | 188/72.2 |
| 3,548,974 | 12/1970 | Klave | 188/72.6 |
| 3,592,300 | 7/1971 | Thomas | 188/72.2 |
| 3,604,538 | 7/1971 | Tompkin | 188/72.6 X |
| 3,664,468 | 5/1972 | Oka | 188/72.6 X |
| 3,809,191 | 5/1974 | Woodward | 188/162 X |
| 4,069,899 | 1/1978 | McLane | 188/72.1 |

FOREIGN PATENT DOCUMENTS

| | | | |
|---|---|---|---|
| 1390274 | 1/1965 | France | 188/72.2 |
| 0945846 | 1/1964 | United Kingdom | 188/72.6 |
| 1057030 | 2/1967 | United Kingdom | 188/73.41 |
| 2130320 | 5/1984 | United Kingdom | 188/72.1 |

*Primary Examiner*—Andres Kashnikow
*Assistant Examiner*—Richard Potosnak
*Attorney, Agent, or Firm*—Banner, Birch, McKie & Beckett

[57] ABSTRACT

There is disclosed a disk brake assembly which includes a brake pad adapted to be urged by an electric motor into braking engagement with a brake disk rotatable with, for example, the wheel of a vehicle, the brake pad being supported for pivotal movement about an axis in the plane parallel to and spaced laterally from the face of the brake disk and exposed substantially at a right angle to a line tangent to the periphery of and in the plane of the brake disk and downstream from the brake pad in the direction of rotation of the brake disk whereby the frictional force between the brake pad and the brake disk has a component complementary to the force exerted by the motor to urge the brake pads against the brake disk.

8 Claims, 2 Drawing Sheets

# DISK BRAKE ASSEMBLY

FIELD OF THE INVENTION

This invention relates to disk brake assembly and more particularly to a disk brake assembly in which the force urging the brake pads and disk into frictional engagement is supplied by an electric motor.

DESCRIPTION OF THE PRIOR ART

Disk brake assemblies actuated by electric motors are known. In a conventional assembly of this type the electric motor acts directly to foce the brake disk and pads into contact, which requires a relatively large motor to obtain the required braking force. Because of the force and the size of the motor required, such assemblies have relatively large electrical requirements.

SUMMARY OF THE INVENTION

An object of the present invention is to provide a disk brake assembly actuated by an electric motor having improved brake actuating means. Other objects will be apparent from an understanding of the invention.

In accordance with this invention there is provided a disk brake assembly actuated by an electric motor in which contact between the brake pads and brake disk has a self-energizing component that acts to multiple the force urging the brake pads and disk into braking engagement -- that is, the force urging the brake pads and disks into contact is greater than the force applied by the electric motor that serves to initiate the braking engagement. Accordingly there is provided a brake pad on one face of a brake disk that is mounted for pivotable movement bodily about a fixed axis that is generally normal to a line that is tangent to the periphery of the brake disk and disposed in a plane parallel to and spaced laterally from the face of the brake disk. The pivot axis is positioned in front of or downstream from the brake pad in the direction of rotation of the brake disk whereby the frictional force exerted on the brake pad from the contact between the brake disk and the brake pad has a component that is complementary to the applied force exerted by the motor for urging the brake pads and brake disk together into frictional or braking engagement, and thus enhances that force. Accordingly a portion of the braking effort itself is used to increase the force urging the brake pads and disk into engagement, thus reducing the work required of the motor.

BRIEF DESCRIPTION OF THE DRAWINGS

Various other objects, features and attendant advantages of the present invention will be more fully appreciated as the same becomes better understood from the following detailed description when considered in connection with the accompanying drawings in which.

DESCRIPTION OF THE PREFERRED EMBODIMENT

Figure 1:
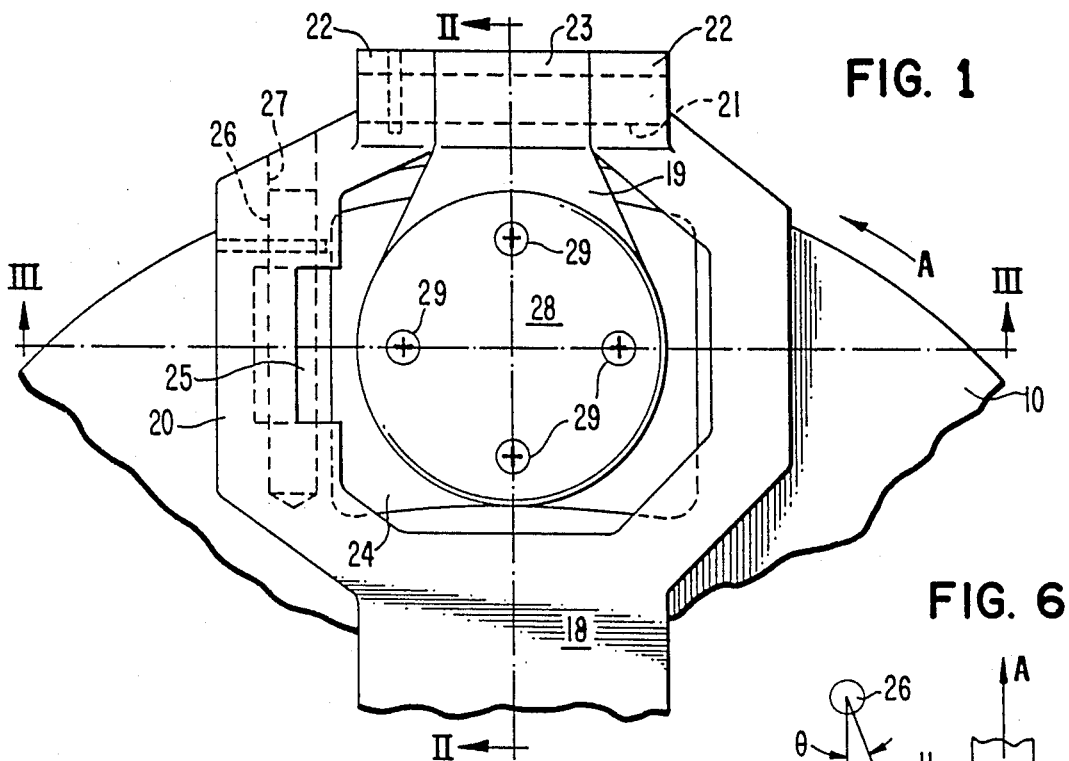
FIG. 1 is a fragmentary elevational view of a disk brake embodying the present invention.

With reference to the drawings there is shown a circular brake disk 10 adapted to rotate with the wheel (not shown) to be braked, about an axis (not shown) at a right angle to the plane of the disk -- the brake disk normally rotating in the direction of the arrow A, FIG. 1.

A first brake pad 11 and a second brake pad 12 are disposed in opposed relation on the opposite faces of the brake disk 10 with the pads in the usual manner having planar surfaces 13 and 14, respectively, that are adapted to engage the planar faces 15 and 16 of the brake disk 10.

The second brake pad 12 is mounted on an arm 17 of a generally U-shaped support bracket or yoke 18 that straddles the edge portion of the brake disk 10 and has an opposed arm 19 disposed on the opposite side of the brake disk 10 from the arm 17. The yoke 18 is pivotably mounted on a frame element 20 by a pivot pin 21 extending through lugs 22 of the frame element 20 and a mounting portion 23 of the yoke 18 that is disposed between the lugs 22. The pivot pin 21 is disposed with the axis thereof between the planes defined by the faces 15 and 16 of the brake disk 10 and is arranged substantially parallel and spaced outwardly radially of the brake disk 10 from a line tangent to the periphery of the brake disk 10 whereby the brake pad 12 is adapted to swing into and out of braking engagement with the adjacent face of the brake disk 10 on pivotal movement of the yoke 18 about the pivot pin 21.

Figure 2:
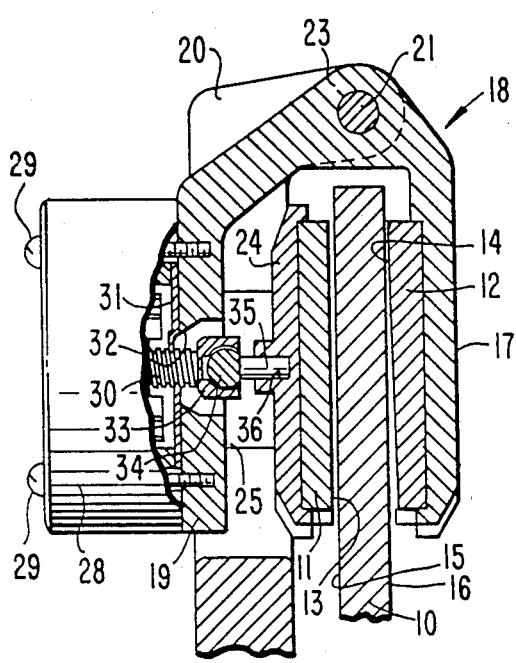
FIG. 2 is a cross-sectional view substantially on the line II—II of FIG. 1.
Figure 3:
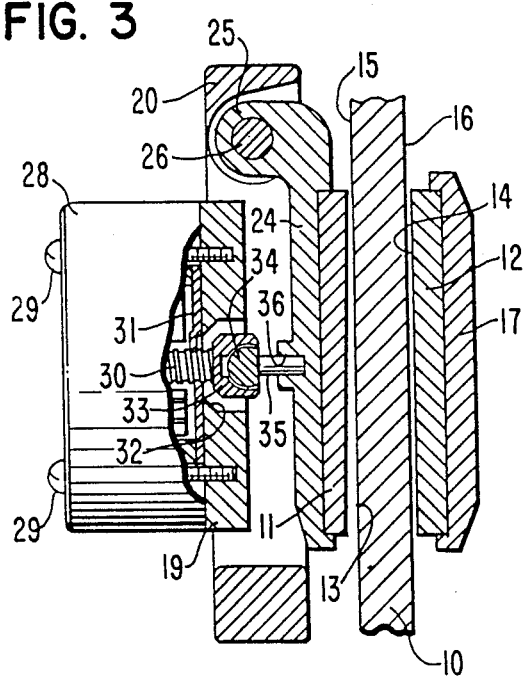
FIG. 3 is a cross-sectional view taken substantially along the line III—III of FIG. 1.

The first brake pad 11 is carried by a support plate 24 having a bearing portion 25 at the rear edge thereof that is off-set in the direction away from the brake disk 10. The support plate 24 is pivotably mounted on the frame element 20 by a pivot pin 26 that is seated in a bore 27 formed in the frame element 20 and through the bearing portion 25. As seen in FIG. 3, the pivot pin 26 is arranged on an axis that is spaced from the face 15 of the brake disk 10 by the off-set at the bearing portion 25 and is also arranged with the axis thereof disposed in a plane parallel to the face 15 of the brake disk 10 and substantially normal to a line tangent to the periphery of the brake disk 10 at a point located substantially at the top of disk 10 as seen in FIG. 2 that is it's at a right angle to a plane through the tangent line and parallel to the axis of the brake disk 10, which places the axes of the pivot pin 26 at substantially a right angle to the axis of the pivot pin 21.

The brake pad 11 is forced into frictional contact with the face 15 of the brake disk 10 by a reversible electric motor 28 that is secured as by bolts 29 to the arm 19 of the yoke 18. The motor 28 has a shaft 30 that is endwise movable to a limited extend and is formed with a screw thread. The shaft 30 extends through an aperture in a thrust plate 31 secured to the face of the arm 19 whereby the shaft 30 is moved endwise upon relative motion between the shaft 30 and the thrust plate 31. The force applied by the motor 28 would in the usual manner be a function of the amount that the brake pedal of the vehicle is depressed—the further or harder it's depressed, the more force is applied by the motor 28 to provide increased braking.

The shaft 30 extends through an aperture 32 in the arm 19 and, at the free end thereof, is provided with a socket 33 that receives the ball end 34 of a thrust pin 35 seated in a socket 36 formed in the opposed face of the support plate 24—the ball 34 and socket 33 forming a self-aligning joint that is adapted to accommodate swinging of the support plate 24 about the pivot pin 26 as the shaft 30 is moved endwise.

Figure 4:
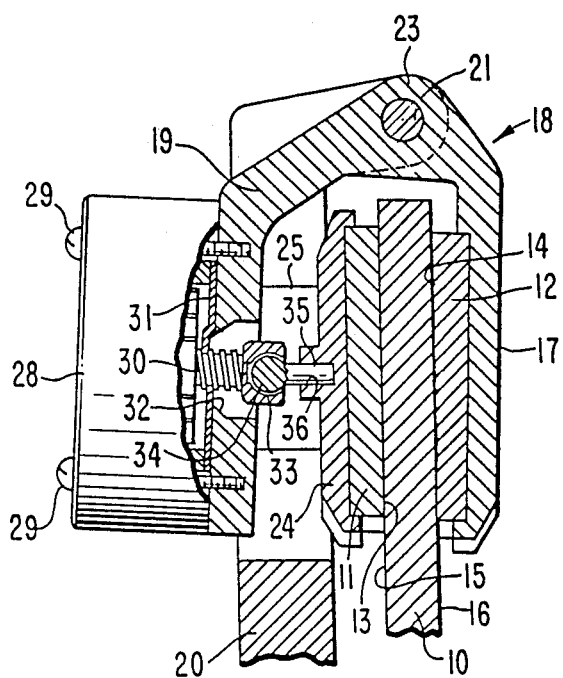
FIG. 4 is a view similar to FIG. 2 but showing the relative position of one of the brake pads during operation.

The brake pad 11 is thus adapted to be swung about the axis of the pivot 28 and thus moved toward and from the brake disk 10 as the motor 28 is actuated. At the same time, with the motor 28 supported by the arm 19 of the yoke 18, reaction to pressure asserted against the support plate 24 tends to pivot the yoke 18 clockwise about the pivot pin 21 as seen in FIGS. 2 and 4, which forces the brake pad 12 against the face 16 of the brake disk 10.

Pivot pin 26 is spaced laterally from brake disk 10, forward of the downstream edge of brake pad 11. Downstream is defined with respect to the rotation axis of brake disk 10 in FIG. 3 such that a point on the periphery of brake disk 10 moves downwardly towards the plane of the page on the downstream side of the rotation axis. Thus the downstream edge of brake pad 11 is located near pivot pin 26. The upstream edge of brake pad 11 is defined to be the edge opposite of the downstream edge, away from pivot pin 26. Upstream and downstream are defined with respect to rotation of the disk during forward motion of the vehicle.

Figure 5:
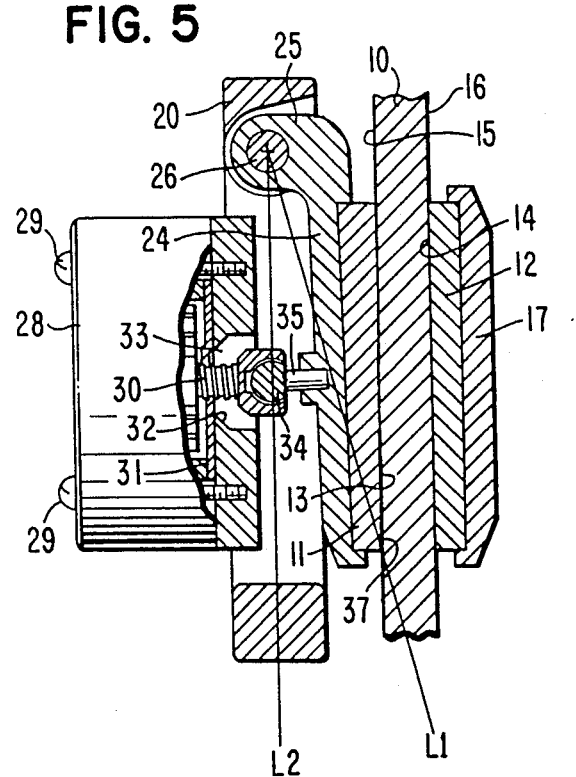
FIG. 5 is a view similar to FIG. 3 but showing the relative position of the other of the brake pads during operation.

The brake pad 11 swings into contact with the brake disk 10 as the motor 28 is operated, with the brake pad 11 contacting the brake disk 10 first at the upstream edge 37 thereof as shown in FIG. 5. Friction between the brake pad 11 and the brake disk 10 produces a reaction force on the brake pad 11 that is imposed on the pivot pin 26 which, since it's offset laterally relative to the brake disk 10, is imposed along the line L1 as seen in FIG. 5. The force against the pivot pin 26 along the line L1 represents a reaction force in the plane of the brake disk 10 that is equal and opposite to the frictional drag on the brake disk 10, plus a component at right angles to the brake disk 10 that is a function of the co-efficient of friction and the angle between the line L1 and a line L2 through the axis of the pivot pin 26 and parallel to the face of the brake disk 10. This component is complementary to the force imposed by the motor 28 urging the brake pad 11 against the brake disk 10 and constitutes a self-energizing force that increases the force urging the brake pad 11 and disk 10 into braking engagement.

Figure 6:
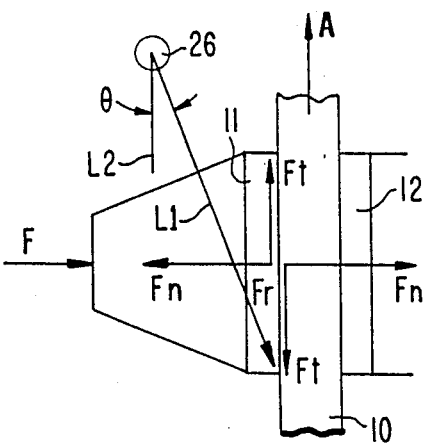
FIG. 6 is a schematic diagram of the forces involved in the operation of the disk brake of FIG. 1.

With reference to FIG. 6 there is shown a force diagram illustrating the operation of a disk brake assembly in accordance with this invention. The force F is the force applied to the brake pad 11 by the motor 28 to urge the same into braking engagement with the brake disk 10, and the force Fn is the total force urging the brake pad 11 into braking engagement with the brake disk 10, that is, the force F applied by the motor 28 plus a force component (Fr) generated by the frictional contact between the brake pad 11 and the brake disk 10 tending to swing the brake pad 11 into engagement with the brake disk 10. The force Ft is the frictional force on the brake pad 11 and the brake disk 10 and is a function of the force Fn and the co-efficient of friction ($\mu$) between the brake pad 11 and the brake disk 10.

Figure 7:
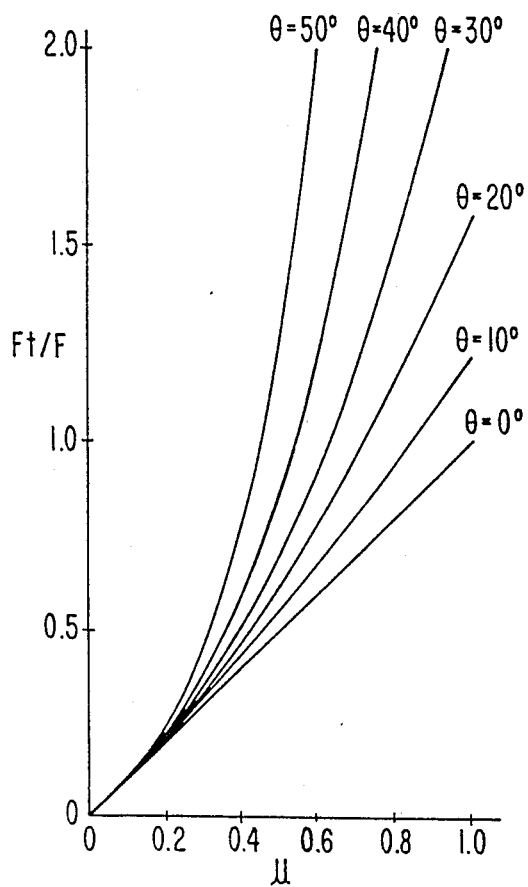
FIG. 7 is a graph showing how the ratio of the frictional force relative to the applied force varies with materials of different co-efficients of friction, the different curves representing different angular relations of the brake pads support relative to the plane of the brake surface of the brake disk.
Figure 8:
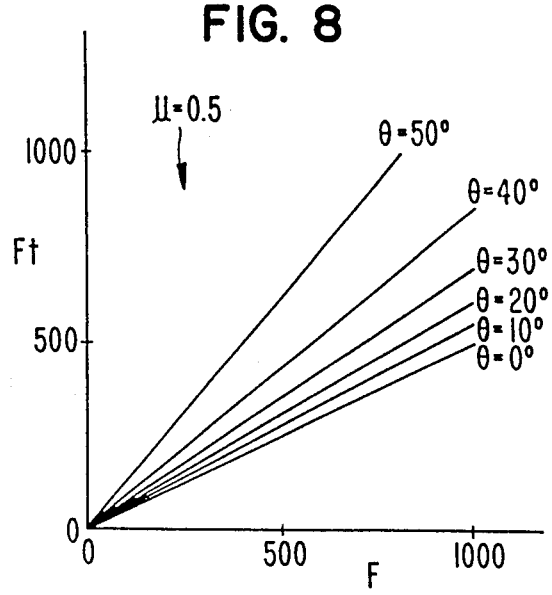
FIG. 8 is a graph showing the relationship between the frictional forces and the applied forces at different angular relations of the brake pads support relative to the plane of the brake surface of the brake disk, the materials in each case having a co-efficient of friction of 0.5.

The force component Fr is of course a function of the angle between the lines L1 and L2 and the co-efficient of friction. In FIGS. 7 and 8 there is shown the relationship between the force applied by the motor 28, the frictional force Ft on the brake pad 11 and brake disk 10 and the angle ($\theta$) and co-efficient of friction ($\mu$). The preferred value for the angle $\theta$ is between fifteen and forty-five degrees when the co-efficient of friction is about 0.5. A limiting factor of course is that the brake pad 11 will become wedged against the brake disk 10 and locked against rotation when the combination of the co-efficient of friction and the angle at which the support for the brake pad 11 approaches the brake disk 10 is too high.

Obviously numerous modifications and variations of the present invention are possible in light of the above teachings. It is therefore to be understood that within the scope of the appended claims the invention may be practiced otherwise then as specifically described herein.

We claim:

1. A disk brake assembly comprising first and second brake pads having planar faces adapted to frictionally engage opposite planar faces of a rotatable brake disk, means for supporting said first brake pad laterally of a first face of said brake disk for pivotable movement about a first fixed axis disposed in a plane space from and parallel to one said first planar face of said brake disk, said fixed axis disposed substantially normal to a plane containing a line tangent to the periphery of said brake disk at a point located substantially near the top of said brake disk, said first brake pad pivotable about said fixed axis into and out of engagement with the brake disk such that only said first brake pad initially engages the brake disk only at the upstream edge of said first brake pad, a reversible electric motor, and drive means responsive to the actuation of said motor for moving said first brake pad about said fixed axis into and out of engagement with the brake disk.

2. The brake disk assembly of claim 1 wherein said electric motor is mounted on a support bracket, and said drive means comprises a threaded shaft rotatable upon actuation of said motor and threaded through said support bracket for endwise movement of said shaft upon rotation thereof.

3. The disk brake assembly of claim 2 wherein said drive means includes means for accommodating relative motion between said threaded shaft and said means for supporting said brake pad upon endwise movement of said threaded shaft and pivotal movement of said means for supporting said brake pad about said fixed axis.

4. The disk brake assembly of claim 3 wherein said means for accommodating relative motion between said threaded shaft and said means for supporting said brake pad comprises a self-brake pad joint.

5. The disk brake assembly of claim 2, said second brake pad supported by said support bracket, said second brake pad contacting the opposite side of said brake disk from said first brake pad upon further actuation of said motor after said first brake pad is engaged with said brake disk.

6. The disk brake assembly of claim 5, said support bracket including arms extending on either side of said brake disk, said assembly further including means for pivotably mounting said support bracket about a second fixed axis disposed above and generally in the same plane as said brake disk, said second fixed axis disposed normal to said first fixed axis, said support bracket pivoting about said second fixed axis to move said second brake pad into engagement with said brake disk.

7. The disk brake assembly recited in claim 1 further comprising means for supporting said second brake pad laterally of an opposite face of said brake disk and for supporting said electric motor on the same side of said brake disk as said first brake pad, further actuation of said motor moving said second brake pad into engagement with said opposite face of said brake disk.

8. A disk brake assembly comprising a frame element, a yoke pivotally mounted on said frame element and having arms disposed on opposite sides of a brake disk, said yoke pivotable about a first axis disposed above and generally in the same plane as said brake disk, a support plate pivotally mounted on said frame element about a second axis substantially normal to a plane containing said first axis, said second axis located in a plane spaced from and parallel to a planar face of said brake disk, a first brake pad carried by said support plate and adapted to frictionally engage said planar face of said brake disk upon pivotal movement of said support plate around said second axis, a second brake pad carried on one arm of said yoke and adapted to frictionally engage an opposite face of said brake disk, and a reversible drive means carried on a second arm of said yoke and engaging said support plate to urge said first brake pad against said brake disk by pivotal motion of said first brake pad about said second axis, simultaneously pivoting said yoke around said first axis to move said second brake pad into engagement with said opposite face of said brake disk.

* * * * *